(12) United States Patent
Masters et al.

(10) Patent No.: US 9,714,194 B2
(45) Date of Patent: *Jul. 25, 2017

(54) METHODS FOR CONTROLLED LASER-INDUCED GROWTH OF GLASS BUMPS ON GLASS ARTICLES

(71) Applicant: CORNING INCORPORATED, Corning, NY (US)

(72) Inventors: Leonard Thomas Masters, Painted Post, NY (US); Alexander Mikhailovich Streltsov, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/141,647

(22) Filed: Apr. 28, 2016

(65) Prior Publication Data

US 2017/0022101 A1    Jan. 26, 2017

Related U.S. Application Data

(62) Division of application No. 14/808,579, filed on Jul. 24, 2015, now Pat. No. 9,359,252.

(51) Int. Cl.
*C03C 23/00*    (2006.01)
*B23K 26/03*    (2006.01)
*B23K 26/00*    (2014.01)
*B23K 26/354*   (2014.01)
*B32B 3/30*     (2006.01)
(Continued)

(52) U.S. Cl.
CPC ...... *C03C 23/0025* (2013.01); *B23K 26/0006* (2013.01); *B23K 26/0084* (2013.01); *B23K 26/032* (2013.01); *B23K 26/352* (2015.10);

*B23K 26/354* (2015.10); *B32B 3/30* (2013.01); *B32B 17/06* (2013.01); *C03B 23/02* (2013.01); *C03C 23/002* (2013.01); *E06B 3/663* (2013.01); *E06B 3/6612* (2013.01); *B23K 2203/54* (2015.10); *B32B 2307/304* (2013.01); *B32B 2307/412* (2013.01); *B32B 2419/00* (2013.01)

(58) Field of Classification Search
CPC .......... G03B 23/02; C03C 23/00; C32B 17/06
USPC .......................................................... 65/102
See application file for complete search history.

(56) References Cited

U.S. PATENT DOCUMENTS 1,770,200 A    7/1930    Comstock
4,393,105 A    7/1983    Kreisman
(Continued)

FOREIGN PATENT DOCUMENTS

CN    201169564    12/2008
CN    101462821    6/2009
(Continued)

OTHER PUBLICATIONS

Antworten; "FAQ/Info VIG+ProVIG" 15 pages.
(Continued)

*Primary Examiner* — Mark Halpern (57) ABSTRACT

A method for controlling formation of glass bumps in a glass article with laser-irradiation without the use of a growth-limiting structure. Standard deviation of height between the glass bumps on the article is less than 1 micron by controlling the laser radiation dose provided on the glass article.

22 Claims, 2 Drawing Sheets

(51) Int. Cl.
*B32B 17/06* (2006.01)
*C03B 23/02* (2006.01)
*E06B 3/66* (2006.01)
*E06B 3/663* (2006.01)
*B23K 26/352* (2014.01)
*B23K 103/00* (2006.01)

(56) References Cited

U.S. PATENT DOCUMENTS

| | | | |
|---|---|---|---|
| 4,683,154 A | 7/1987 | Benson et al. | |
| 5,027,574 A | 7/1991 | Phillip | |
| 5,379,149 A | 1/1995 | Snitzer et al. | |
| 5,794,404 A | 8/1998 | Kim | |
| 5,840,239 A | 11/1998 | Partanen et al. | |
| 5,877,103 A | 3/1999 | Dupont et al. | |
| 6,291,036 B1 | 9/2001 | Wang et al. | |
| RE37,585 E | 3/2002 | Mourou et al. | |
| 6,472,295 B1 | 10/2002 | Morris et al. | |
| 6,541,084 B2 | 4/2003 | Wang | |
| 6,689,241 B1 | 2/2004 | Delhorme et al. | |
| 6,701,749 B2 | 3/2004 | Wang et al. | |
| 6,720,058 B1* | 4/2004 | Weeks | B29C 65/086 428/89 |
| 6,946,171 B1 | 9/2005 | Aggas | |
| 7,152,434 B2 | 12/2006 | Hashimoto et al. | |
| 7,244,325 B2 | 7/2007 | Abate et al. | |
| 7,845,142 B2 | 12/2010 | Theios | |
| 8,257,603 B2 | 9/2012 | Logunov et al. | |
| 8,291,729 B2 | 10/2012 | Grzybowski et al. | |
| 8,307,672 B2 | 11/2012 | Hidaka et al. | |
| 8,397,537 B2 | 3/2013 | Grzybowski et al. | |
| 8,616,023 B2 | 12/2013 | Grzybowski et al. | |
| 8,821,999 B2 | 9/2014 | Grzybowski et al. | |
| 8,955,358 B2 | 2/2015 | Grzybowski et al. | |
| 9,359,252 B1 | 6/2016 | Masters et al. | |
| 2003/0209040 A1 | 11/2003 | Hashimoto et al. | |
| 2005/0132662 A1 | 6/2005 | Hornung et al. | |
| 2007/0148379 A1 | 6/2007 | Theios et al. | |
| 2007/0201797 A1 | 8/2007 | Grzybowski et al. | |
| 2008/0166570 A1 | 7/2008 | Cooper | |
| 2008/0236052 A1 | 10/2008 | Fleming | |
| 2008/0245011 A1 | 10/2008 | Friedl | |
| 2009/0291261 A1 | 11/2009 | Hidaka et al. | |
| 2010/0050692 A1 | 3/2010 | Logunov et al. | |
| 2010/0107525 A1 | 5/2010 | Grzybowski et al. | |
| 2010/0183846 A1 | 7/2010 | Grzybowski et al. | |
| 2011/0039072 A1 | 2/2011 | Grzybowski et al. | |
| 2012/0247063 A1 | 10/2012 | Grzybowski et al. | |
| 2017/0022100 A1* | 1/2017 | Masters | C03C 23/0025 |

FOREIGN PATENT DOCUMENTS

| | | |
|---|---|---|
| EP | 0283971 | 3/1988 |
| EP | 1077302 | 2/2001 |
| JP | 2003089556 | 3/2003 |
| JP | 2007015908 | 1/2007 |
| WO | 9424398 | 10/1994 |
| WO | 9945225 | 9/1999 |
| WO | 2007141583 | 12/2007 |
| WO | 2008002237 | 1/2008 |
| WO | 2010053943 | 5/2010 |

OTHER PUBLICATIONS

Asano et al; "Vacuum Glazing for Transparent Thermal Insulating Material", Proceedings of 8th Glass Processing Days (2003), 6 pages.
Chino; "Revolutionary Super-Insulating Vacuum Glass"; 9 pages.
Griffiths et al; "Fabrication of Evacuated Glazing at Low Temperature"; Solar Energy, vol. 63, No. 4 pp. 243-249, 1998.
Weinlader et al; "VIG—Vacuum Insulation Glass", Bavarian Center for Applied Energy Research; 8 pages.
International Search Report and Written Opinion PCT/US2016/043554 Dated Oct. 26, 2016.

* cited by examiner

METHODS FOR CONTROLLED LASER-INDUCED GROWTH OF GLASS BUMPS ON GLASS ARTICLES

CROSS-REFERENCE TO RELATED APPLICATIONS

This application is a divisional of U.S. patent application Ser. No. 14/808,579 filed on Jul. 24, 2015, the content of which is relied upon and incorporated herein by reference in its entirety, and the benefit of priority under 35 U.S.C. §120 is hereby claimed.

BACKGROUND

The present disclosure relates to methods for controlling formation of glass bumps on glass articles, the glass bumps having a height within a standard deviation.

SUMMARY

The present inventors have recognized that conventional glass bump growth methodologies can be enhanced by utilizing a laser control scheme. By utilizing the presently disclosed bump height control methods, the standard deviation of height between a plurality of glass bumps formed on a glass article is significantly reduced. Although the concepts of the present disclosure are described herein with primary reference to VIG glass products, such as, e.g., VIG windows, the concepts disclosed herein will enjoy broad applicability to any application where glass bumps of uniform height are required on a glass article. It is contemplated that the concepts disclosed herein will enjoy applicability to any laser-induced glass bump growth process without limitation to the particular laser growth system disclosed herein.

According to one embodiment of the present disclosure, a method of forming a glass article comprising a surface and a plurality of glass bumps is disclosed. The glass bumps are formed in the glass article by laser radiation. Each glass bump has a terminal point at a distance from the glass article surface. The standard deviation of distance between the glass article surface and the terminal points of the plurality of glass bumps is less than about 1 micron. According to the method, the glass article is irradiated with laser radiation at a plurality of localities. A back flash of light is detected from the laser irradiated localities on the glass article by a photodetector that generates an electronic signal. The laser irradiation dose at the plurality of localities is controlled using the electronic signal to induce growth of the glass bumps at the plurality of localities on the glass article.

According to another embodiment of the present disclosure, a method of forming a glass pane comprising a surface and a plurality of hemispherical glass bumps is disclosed. The glass bumps are grown on the glass pane surface by laser irradiation. Each glass bump has a height spaced apart from the glass pane surface. The standard deviation of height between the plurality of glass bumps is less than 1 micron. According to the method, the glass pane is irradiated with laser radiation to induce growth of one of the glass bumps at one of a plurality of localities on the glass pane. At a time increment after irradiating one locality with the laser irradiation dose, a back flash of light is detected from that laser irradiated locality with a photodetector. The laser radiation dose is terminated at the locality at a time after the photo detector detects the back flash of light.

According to yet another embodiment of the present disclosure, a glass pane including a plurality of glass bumps formed on a surface of the glass pane is disclosed. Each glass bump comprises a lower region and an upper region connected by an inflection region. The lower region comprises a diameter D1 defined by concavely rounded sides. The lower region projects from the surface of the glass pane. The diameter D1 is the glass bump maximum diameter. The concavely rounded sides have a radius of curvature R1 and join with the glass pane surface. The upper region of the glass bump comprises a transition portion and a top portion. The transition portion comprises a diameter D2 defined by convexly rounded sides, diameter D2 is less than diameter D1. The convexly rounded sides have a radius of curvature R2. The top portion comprises a diameter D3 defined by a convexly rounded top surface joining with convexly rounded sides converging from the transition portion. The convexly rounded top surface has a radius of curvature R3 form about 600 microns to about 750 microns, greater than radius of curvature R2. Diameter D3 is less than diameter D2. The convexly rounded top surface is spaced apart from the glass article surface defining a height H of the glass bump.

BRIEF DESCRIPTION OF THE DRAWINGS

The disclosure will be better understood, and features, aspects and advantages other than those set forth above will become apparent when consideration is given to the following detailed description thereof. Such detailed description makes reference to the following drawings, wherein.

DETAILED DESCRIPTION

Unless defined otherwise, all technical and scientific terms used herein have the same meaning as commonly understood by one of ordinary skill in the art to which the disclosure belongs. Although any methods and materials similar to or equivalent to those described herein can be used in the practice or testing of the present disclosure, the exemplary methods and materials are described below.

A glass article of the present disclosure includes a surface and can have any shape. In one example, the glass article can be round, spherical, curved, or flat. In another example the glass article can be relatively thick (about 10 cm) or relatively thin (about 0.1 mm). In yet another example, the glass article has a thickness between about 0.5 mm and about 8 mm. In one embodiment, the glass article is comprised of a plurality of individual glass components (e.g., multiple square glass articles which may be joined or fused together to a larger glass article). In an exemplary embodiment, the glass article is a glass pane 20 made of a glass material and has top and bottom surfaces and an outer edge. Glass pane 20 of the present disclosure may be substantially flat across its surfaces and may have a rectangular shape.

The glass article of the present disclosure may be formed from soda-lime glass, borosilicate glass, aluminosilicate glass, or an alkali aluminosilicate glass. Other suitable and available glasses and applicable compositions are disclosed, for example, in U.S. Patent Publication No. 2012/0247063, the contents of which are incorporated by reference herein.

The glass article of the present disclosure comprises a plurality of glass bumps 60. In one embodiment, the glass bumps are grown from the surface of the glass article by a laser-irradiation process. Glass bumps 60 of the present disclosure may be used as spacers between parallel, opposing panes of glass in a vacuum-insulated glass (VIG) window. In a VIG window, glass bumps 60 maintain the distance between the opposing glass panes that have a tendency to bow together under the force of vacuum pressure there between and external atmospheric pressure and external forces (e.g., weather). Accordingly, the distance between the parallel, opposing panes of glass in VIG window is substantially equivalent to the heights of the glass bumps.

The present disclosure provides a glass article (e.g., glass pane 20) including a plurality of glass bumps having heights within a standard deviation of each other. Minimal height variation between glass bumps 60 used on VIG window pane reduce the stress concentration on individual bumps applied by the opposing glass pane in a VIG window. Conventional glass bumps with a standard deviation of height greater than 1 micron causes stress (and potential defects) on the opposing glass pane where the taller glass bumps contact the opposing glass pane. Minimal height variation between glass bumps 60 used in a VIG window may also eliminate the requirement for chemical-strengthening of the opposing glass pane to withstand the stress applied by glass bumps 60. In another example, the glass bumps 60 may act as spacers between the glass article and other materials (e.g., metal, plastic, etc.). In yet another example, the glass bumps 60 with minimal height variation may have aesthetic advantages.

Glass bumps 60 may be grown out of a body portion 23 of the glass article and formed from the glass material making up the glass article, so as to outwardly protrude in a convex manner from the glass article surface. In one embodiment, the glass article is comprised of a plurality of individual glass components, each glass component including at least one locality L and/or at least one glass bump 60. The plurality of glass bumps 60 may include any number of glass bumps including as few as 20, 15, 10, 5 glass bumps, or less in the case of a statistically significant number of glass bumps. The fewer number of bumps improves the optical quality of the glass article when used in a VIG window. However, in a VIG window, a sufficient number of bumps are required to support the weight of an opposing pane and other external forces. In an example embodiment, glass bumps 60 are regularly spaced apart on the glass article with respect to each other. Distances between the glass bumps may be from about 1 mm (about 1/25 of an inch) to about 25 centimeters (about 10 inches), or from about 1 centimeter (about 0.4 inches) to about 15 centimeters (about 6 inches). Spacing the glass bumps closer together reduces stress concentration on individual bumps in a VIG window. In another embodiment, the glass bumps are irregularly or randomly spaced apart on the glass article with respect to each other.

Figure 1:
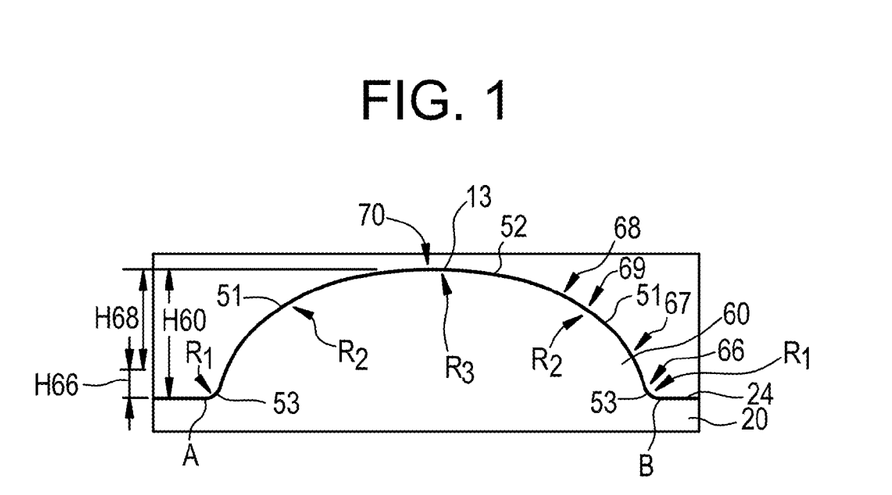
FIG. 1 is a close-up cross-sectional view of a glass bump 60 formed according to an exemplary embodiment.

Referring to FIG. 1, an example of one of the plurality of glass bumps is shown in a close-up cross-sectional view of a glass bump 60 on glass pane 20. Glass bump 60 is hemispherical shaped and includes a lower region 66 and an upper region 68 connected by an inflection region 67. Glass bump 60 has a height H60 measured from a surface 24 of glass pane 20 to a terminal point 13. Terminal point 13 is the location on glass bump 60 at the furthest distance from the surface 24 of glass pane 20. In one embodiment, terminal point 13 may be an area on convexly rounded top surface 52 of glass bump 60. Height H60 of glass bump 60 may range from 50 microns to 200 microns, or from 75 microns to 150 microns, or even from 100 microns to 120 microns in exemplary embodiments. Note that if bump heights H60 are too small, the gap between opposing plates in a VIG window is reduced and, therefrom, a reduced vacuum space between opposing panes and reduced insulating properties. In addition, small glass bump 60 heights H60 can lead to the appearance of optical rings due to light interference between closely arranged glass surfaces.

Lower region 66 of glass bump 60 projects from the surface of glass pane 20 and is integrally formed thereon. Lower region 66 has a height H66 that may extend from about 5% to about 25% of glass bump 60 height H60. Lower region 66 includes a volume V1 and a diameter D1 defined by concavely rounded sides 53. Diameter D1 may be the maximum diameter $D_M$ of glass bump 60. That is, maximum diameter $D_M$ is the distance between the points A and B (shown in FIG. 1) where concavely rounded sides 53 terminate and join with surface 24 of glass pane 20. Maximum diameter $D_M$ may be from about 400 microns to about 800 micron, or even 500 microns to 700 microns.

Concavely rounded sides 53 of lower region 66 include a radius of curvature R1. Concave radius of curvature R1 may be from about 25 microns to about 100 microns. Radius of curvature R1 may vary slightly within the disclosed range at different locations around glass bump 60. Radius of curvature R1 is configured such that glass bump 60 projects from glass pane 20 surface 24 so as not to exceed the disclosed range for diameter D1. Inflection region 67 of glass bump 60 connects lower region 66 and upper region 68. Upper region 68 includes a volume V2 having a transition portion 69 and a top portion 70. Upper region 68 has a height H68 that may extend from about 75% to about 95% of glass bump 60 height H60. Transition portion 69 of upper region 68 includes a diameter D2 defined by convexly rounded sides 51. Diameter D2 may extend from about 33% to about 85% of maximum diameter $D_M$ of glass bump 60. Convexly rounded sides 51 join with concavely rounded sides 53 extending up from lower region 66 at inflection region 67. Convexly rounded sides 51 have a convex radius of curvature R2. Convex radius of curvature R2 may be from about 200 microns to about 400 microns and may vary slightly within the disclosed range at different locations around glass bump 60.

Radius of curvature R2 may be measured over at least 5 microns or 5% of glass bump 60 height H60. Alternatively R2 may be measured over up to 50% glass bump 60 height H60. Diameter D2, measured between convexly rounded sides 51, may be from about 100 microns to about 600 microns. Diameter D2 of transition portion 69, from inflection region 67 to top portion 70, decreases by about 15% to about 65%. Diameter D2 is less than diameter D1 since the total diameter of glass bump 60 gradually decreases from lower region 66 to transition portion 69.

Top portion 70 includes a diameter D3 defined by convexly rounded top surface 52. Convexly rounded top surface 52 is spaced apart from glass pane 20 surface 24 defining height H60 of glass bump 60. Convexly rounded top surface 52 may extend from about 1% to about 3% of glass bump 60 height H60. In other embodiments, convexly rounded top surface 51 may extend from about 10% to about 30% of maximum diameter $D_M$, or about 20% to about 25% of maximum diameter $D_M$. Convexly rounded top surface 52 joins with convexly rounded sides 51 converging from transition portion 69. Convexly rounded top surface 52 has a convex radius of curvature R3 from about 600 microns to about 750 microns, or about 650 microns to about 680 microns.

Radius of curvature R3 is configured to minimize contact between opposing glass panes in a VIG window and heat transfer between the opposing panes through glass bump 60. Radius of curvature R3 is such that it can be formed by a laser irradiation process of the present disclosure without the use of a growth-limiting structure. The laser-irradiation process of the present disclosure, free of a growth-limiting structure, presents significant time savings for growing glass bumps 60 with a distinct radius of curvature on its convex top surface as compared to conventional methods. Specifically, the need to align the glass article relative to the growth-limiting structure before growing glass bump 60 via laser-irradiation is eliminated.

In an exemplary embodiment, convex radius of curvature R3 is greater than the convex radius of curvature R2. In another embodiment, R3 is greater than R2 by about 70% to about 140%, or about 75% to about 100%. In yet another embodiment, convex radius of curvature R3 is greater than concave radius of curvature R1. Diameter D3, measured as a chord on convexly rounded top surface 51, is less than diameter D2. Diameter D3 at its maximum may be from about 100 microns to about 264 microns. Diameter D3 decreases incrementally to a point at or around termination point 13.

Transition portion 69 and top portion 70 are integrally formed together. Further, inflection region 67 connects the lower region 66 and upper region 68 at transition portion 69. Inflection region 67 may be defined by sides without a radius of curvature (i.e., flat and perpendicular to surface 24). In one embodiment, inflection region 67 is a 2-dimensional area (e.g., a plane). In another embodiment, inflection region 67 is a volume V4 extending at most about 5% of glass bump 60 height H60.

In the disclosed embodiment where glass bumps 60 have a hemispherical shape, each glass bump may have a partial or complete circumference that substantially corresponds to a general circle equation (e.g., $x^2+y^2=r^2$) when overlaid thereon with a coefficient of determination from about 0.9 to about 0.99. In another example embodiment where glass bumps 60 have a hemispherical shape, each glass bump has a lateral cross-section (as shown in FIG. 1) substantially matching a portion of a general circle equation with a coefficient of determination from about 0.9 to about 0.99. In another embodiment, glass bumps 60 with a hemispherical shape do not have a critical radius of curvature change point (seen for a "flat-top" glass bump or a glass bump with a top surface radius of curvature from about 900 microns to about 2600 microns) at the connection between convexly rounded sides 51 and convexly rounded top surface 52.

In one embodiment of the present disclosure, glass bumps 60 are formed by photo-induced absorption. Photo-induced absorption includes a local change of the absorption spectrum of a glass article resulting from locally exposing (irradiating), or heating, the glass article with radiation (i.e., laser irradiation). Photo-induced absorption may involve a change in adsorption at a wavelength or a range of wavelengths, including but not limited to, ultra-violet, near ultraviolet, visible, near-infrared, and/or infrared wavelengths. Examples of photo-induced absorption in the glass article include, for example, and without limitation, color-center formation, transient glass defect formation, and permanent glass defect formation. Laser irradiation dose is a function of laser wavelength and a product of laser power P and exposure time.

Figure 2:
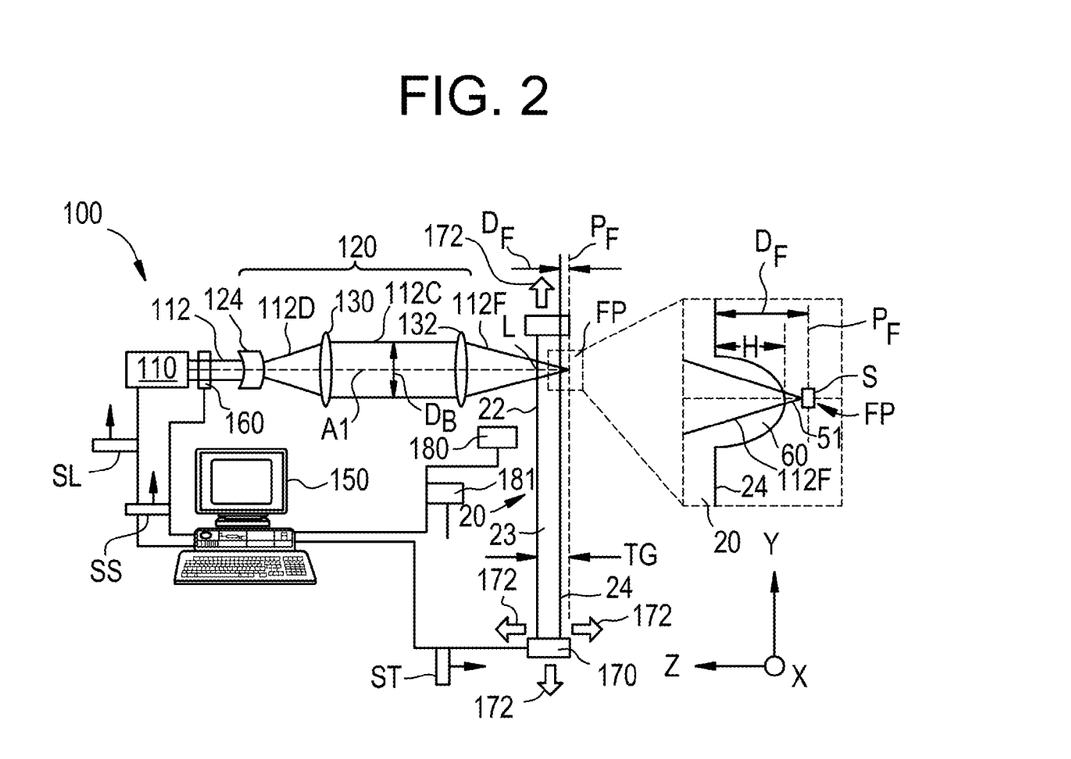
FIG. 2 is a schematic diagram of an example laser-based glass bump forming apparatus used to form glass bumps 60 in a glass article according to an exemplary embodiment.

FIG. 2 is a schematic diagram of an example laser-based apparatus ("apparatus 100") used to form glass bumps 60 in the glass article (e.g., glass pane 20). Apparatus 100 may include a laser 110 arranged along an optical axis A1. Laser 110 emits a laser beam 112 having power P along the optical axis. In an example embodiment, laser 110 operates in the ultraviolet (UV) region of the electromagnetic spectrum. Laser irradiation dose is a function of laser beam 112 wavelength and is a product of laser beam 112 power P and an exposure time.

Apparatus 100 also includes a focusing optical system 120 that is arranged along optical axis A1 and defines a focal plane $P_F$ that includes a focal point FP. In an example embodiment, focusing optical system 120 includes, along optical axis A1 in order from laser 110: a combination of a defocusing lens 124 and a first focusing lens 130 (which combination forms a beam expander 131), and a second focusing lens 132. In an example embodiment, defocusing lens 124 has a focal length fD=−5 cm, first focusing lens 130 has a focal length fC1=20 cm, and second focusing lens 132 has a focal length fC2=2.5 cm and a numerical aperture NAC2=0.5. In another example embodiment, defocusing lens 124 and first and second focusing lenses 130 and 132 are made of fused silica and include anti-reflection (AR) coatings. Alternate example embodiments of focusing optical system 120 include mirrors or combinations of mirrors and lens elements configured to produce focused laser beam 112F from laser beam 112.

Apparatus 100 also includes a controller 150, such as a laser controller, a microcontroller, computer, microcomputer or the like, electrically connected to laser 110 and adapted to control the operation of the laser. In an example embodiment, a shutter 160 is provided in the path of laser beam 112 and is electrically connected to controller 150 so that the laser beam can be selectively blocked to turn the laser beam "ON" and "OFF" using a shutter control signal SS rather than turning laser 110 "ON" and "OFF" with a laser control signal SL.

Prior to initiating the operation of apparatus 100, the glass article is disposed relative to the apparatus. Specifically, the glass article is disposed along optical axis A1 so that a surface of the glass article is substantially perpendicular to the optical axis A1. In an example embodiment, glass pane 20, including a front surface 22 and back surface 24, is disposed relative to optical axis A1 so that back glass pane surface 24 is slightly axially displaced from focal plane $P_F$ in the direction towards laser 110 (i.e., in the +Z direction) by a distance DF. In an example embodiment, glass pane 20 has a thickness TG in the range 0.5 mm≤TG≤6 mm. In another embodiment, 0.5 mm≤DF≤2 mm.

In an example method of operating apparatus 100, laser 110 may be activated via control signal SL from controller 150 to generate laser beam 112. If shutter 160 is used, then after laser 110 is activated, the shutter is activated and placed in the "ON" position via shutter control signal SS from controller 150 so that the shutter passes laser beam 112. Laser beam 112 is then received by focusing optical system 120, and defocusing lens 124 therein causes the laser beam to diverge to form a defocused laser beam 112D. Defocused laser beam 112D is then received by first focusing lens 130, which is arranged to form an expanded collimated laser beam 112C from the defocused laser beam. Collimated laser beam 112C is then received by second focusing lens 132, which forms a focused laser beam 112F. Any point within the volume defined by the intersections between the converging laser beam 112F and glass pane 20 front surface 22 and back surface 24 is referred to herein as a locality L. Laser beam 112F may be focused on a different area of glass pane 20 to form another locality L.

Conventional methods of operating apparatus 100 include irradiating the glass article with a laser irradiation for a set period of time. That is, the glass article is exposed to laser beam 112F at a plurality of localities L on its surface with a fixed dose of laser irradiation. Thus, the laser is turned "ON" and "OFF" at the same interval at each location to form glass bumps at each locality L. However, these conventional methods do not consider, for example, variations or defects in the glass article surface or structure, power output variations from laser 110, and/or other variables that may change between each pulse of laser irradiation on the glass article surface. Accordingly, conventional laser irradiation methods result in a plurality of glass bumps with large height H variations and standard deviations. Specially, height H variation between the plurality of glass bumps formed by conventional laser irradiation methods may result in deviations greater than about 2 microns and/or standard deviation greater than or equal to about 1.1 micron. Conventional methods of operating apparatus 100 also include using a growth-limiting structure (e.g., a plate) adjacent the glass article during glass bump formation to limit growth of the glass bump on the article to a certain height. As a result, glass bumps formed by conventional methods include a "flat-top" profile with an inflection point between the convexly rounded side walls and the convexly rounded top surface. This "flat-top" profile includes a convexly rounded top surface (along 1-3% of height H) with a radius of curvature R5 from about 3000 microns to about 4500 microns.

In the present method of operating apparatus 100, laser beam 112F contacts glass pane 20 at a time increment Ti after laser 110 is activated. Time increment Ti ends at or about when converging laser beam 112F converges and contacts glass pane 20 front surface 22. Time increment Ti may vary from a picosecond to several seconds for each locality L as a result of, for example, laser 110 output variances, control signal SL or SS dead time, laser beam 112 travel time, shutter 160 opening and closing time, and/or optical system 120 changes. Laser beam 112 power P may be increased or decreased during time increment Ti.

As time increment Ti ends, time increment Tc begins as focused laser beam 112F converges or when laser beam 112F contacts glass pane 20. In an example embodiment, laser beam 112F contacts and passes through glass pane 20 and forms a focus spot S along optical axis A1 at focal point FP. Focal point FP may be at distance DF from glass pane back surface 24 and thus resides outside of body portion 23. It is noted here that glass pane 20 slightly affects the position of focal point FP of optical system 20 because focused laser beam 112F converges as it passes through the glass pane. However, the thickness TG of glass pane 20 may be sufficiently thin so that this focus-shifting effect can be ignored.

A portion of focused laser beam 112F is absorbed as it passes through glass pane 20 (at locality L) due to the aforementioned photo-induced absorption in the glass pane. This serves to locally heat glass pane 20 at locality L. The amount of photo-induced absorption may be relatively low, e.g., about 3% to about 50%. When focused light beam 112F is locally absorbed in glass pane 20, a flash of light emanates from locality L.

The flash of light from locality L according to the present disclosure is a back flash of light from the front surface 22 of glass pane 20. That is, the flash of light emanates in a direction opposite the direction of focused laser beam 112F (i.e., backwards). The back flash of light is not a detection of the focused laser beam though glass pane 20 or on the back surface 24 of glass pane 20. Instead, the flash of light is a detection of 20% to 100% of the maximum output signal 61 from photodetector 180, or even 35% to 85% of the maximum output signal 61 from photodetector 180. The output signal 61 from photodetector 180 may correspond to fluorescence intensity emanating from locality L on the front surface 22 of glass pane 20. Detecting the back flash of light emanating from locality L on the front surface 22 of glass pane 20 (i.e., where the laser beam 112F contacts glass pane 20) provides an advantage over conventional methods in that bump heights are more precisely controlled (i.e., within a standard deviation of less than 1.1 microns, or less). The change in fluorescence intensity emanating from locality L, detected as output signal 61, may be measured against the maximum output signal 61 from photodetector 180 or against contact output 15 registered by photodetector 180, corresponding to detected light emanating from locality L after laser beam 112F initially contacts glass pane 20. Without being limited to any particular theory, the flash of light emanating from laser irradiated locality L on the front surface 22 of glass pane 20 may be molten glass at a temperature from about 900° C. to about 2000° C., or even about 900° C. to about 1500° C. In an exemplary embodiment, the flash of light is comprised of a broad spectrum of electromagnetic emission, including but not limited to, ultraviolet, near ultra-violet, visible, near-infrared, and/or infrared wavelengths.

Time increment Tc may conclude when the flash of light emanates from laser irradiated locality L. That is, time increment Tc continues from when laser beam 112F contacts glass pane 20 until the flash of light is detected by a photodetector 180. In this example, photodetector 180 transmits an electronic signal 181 (e.g. as illustrated in the FIG. 3 graph) to controller 150. In an exemplary embodiment, controller 150 will recognize an output signal 61 within electronic signal 181 from photodetector 180. Thus, time increment Tc may continue from when laser beam 112F contacts glass pane 20 until output signal 61 is received or detected by controller 150 within electronic signal 181 from photodetector 180. Yet, in other embodiments, the flash of light may be detected by any device (e.g., a photodiode) capable of detecting photons of light, light energy, or luminescence and producing an electronic signal 181 to controller 150. Following detection of the flash of light, controller 150 may be configured to adjust the laser beam 112 power P, set a time for continued operation of laser 110, or turn "OFF" laser 110 (i.e., terminate laser irradiation) via control signal SL or SS.

The duration of time increment Tc may fluctuate between various localities L in glass pane 20. This fluctuation or variance in the duration of time increment Tc between localities L may be from a picosecond to several milliseconds. Without being limited to any particular theory, this may be caused by fluctuations in laser 110 output power P, glass article thickness, and/or compositional and/or microstructural differences at each locality L. Accordingly, each locality may require a slightly different laser irradiation dose to initiate the flash of light.

Figure 3:
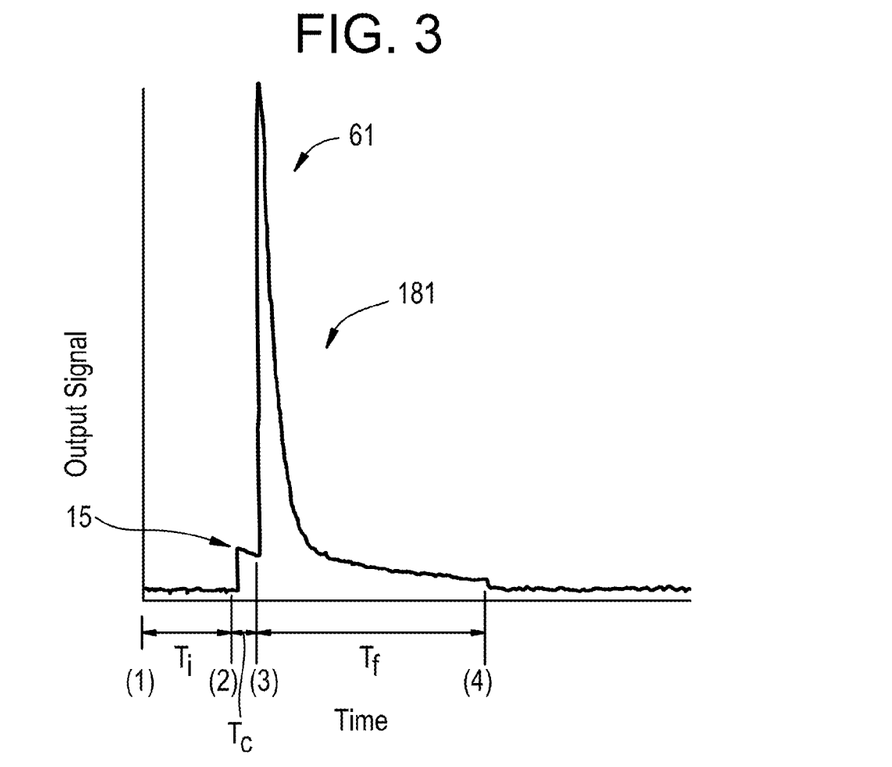
FIG. 3 illustrates a graph of a photodetector electronic signal output (signal output (arbitrary units) vs. time (seconds)) during glass bump growth according to an exemplary embodiment.

The end of time increment Tc during laser irradiation begins an exposure time Tf. In one embodiment, the start of exposure time Tf corresponds with the start of glass bump formation. The beginning of exposure time Tf may be adjusted by fractions of a second using various control schemes. For example, controller 150 may be programmed to recognize the "ramping-up" (i.e., a large delta) output signal 61 within electronic signal 181 from photodetector 180 to initiate time increment Tf. That is, controller 150 may be programmed to recognize from 20% to 100% of the maximum output signal 61 from photodetector 180, or even 35% to 85% of the maximum output signal 61 from photodetector 180. In another example, controller 150 is programmed to initiate time increment Tf when output signal 61 within electronic signal 181 reaches a chosen output unit. In yet another example, controller 150 is programmed to recognize the maximum or "peak" (i.e., 100% of photodetector 180 output signal 61) within electrical signal 181 from photodetector 180. In FIG. 3, the "peak" of output signal corresponds to 100% of the maximum output of photodetector 180. In yet another example, controller 150 may be programmed to recognize the "ramping-down" (i.e., a large delta) in output signal 61 within electronic signal 181 from photodetector 180 to initiate time increment Tf. The laser irradiation dose at locality L following time increment Tc (i.e., during exposure time Tf) affects height H60 of the resultant glass bump 60.

At some time before or after the start of exposure time Tf the glass bump begins to form as a limited expansion zone is created within glass pane 20 body portion 23 in which a rapid temperature change induces an expansion of the glass. Since the expansion zone is constrained by unheated (and therefore unexpanded) regions of glass surrounding the expansion zone, the molten glass within the expansion zone is compelled to relieve internal stresses by expanding/flowing upward, thereby forming glass bump 60. If focused laser beam 112F has a circularly symmetric cross-sectional intensity distribution, such as a Gaussian distribution, then the local heating and the attendant glass expansion occurs over a circular region in glass pane body 23, and the resulting glass bump 60 may be substantially circularly symmetric.

Generally, a longer duration of exposure time Tf at locality L results in an increased glass bump 60 height H60. Increased laser beam 112 power P at locality L during exposure time Tf may also result in an increased glass bump 60 height H60. Exposure time Tf and laser beam 112 power P may also have an effect on bump geometry. Controller 150 may be configured to adjust laser beam 112 power P during exposure time Tf Exposure time Tf may be from a millisecond to several seconds depending on the glass article composition and structure, and the desired bump height and geometry. In exemplary embodiments, exposure time Tf may be from about a millisecond to about 5 seconds. In another exemplary embodiment, laser power may be from a few watts to tens of watts, or about 10 watts to about 20 watts.

In an exemplary method of operating apparatus 100, laser beam 112 power P is held constant (e.g., at 15 watts) and exposure time Tf is a fixed time from about 1 millisecond to about 2 seconds or more. In another embodiment of operating apparatus 100, laser beam 112 power P is increased or decreased during fixed exposure time Tf Contemplated UV wavelengths for effective glass bump 60 growth may be between about 340 nanometers and about 380 nanometers. Contemplated IR wavelengths for effective glass bump 60 growth may be between 750 nanometers and 1600 nanometers. Other wavelengths on the electromagnetic spectrum are also contemplated, for example, between 300 nanometers and 1600 nanometers. After exposure time Tf, laser 110 may be turned "OFF" with a laser control signal SL or shutter control signal SS such that glass pane 20 is not contacted by laser beam 112F. Thus, exposure time Tf ends when locality L is no longer contacted by laser beam 112F. The resulting glass bump 60 grown from locality L is fixed by terminating laser beam 112F irradiation at locality L. Thereafter, glass bump 60 may be fixed by rapid radiative cooling.

Referring to FIG. 3, an example electronic signal output graph from photodetector 180 in arbitrary units versus time (e.g., seconds) showing electronic signal 181 during glass bump 60 growth. In exemplary embodiments, electronic signal 181 corresponds to the signal produced by photodetector 180 and sent to controller 150. In FIG. 3, time increment Ti is shown between (1) laser 110 activation and (2) converging laser beam 112F contacting glass pane 20. After laser beam 112F contacts glass pane 20, photodetector 180 registers a contact output 15 corresponding to detected light emanating from locality L. In example embodiments, light detected at contact output 15 is less than 20% of the maximum output signal 61 from photodetector 180. Time increment Tc is shown between (2) converging laser beam 112F contacting glass pane 20 and (3) the start of the flash of light. During time increment Tc, photodetector 180 registers a relatively constant output of light detection. Time increment Tf is shown between (3) the start of the flash of light and (4) termination of glass pane 20 exposure to laser beam 112F. The flash of light is indicated as a distinct, sharp output signal 61 (i.e., from 20% to 100% of the maximum output signal 61) from photodetector 180 during time increment Tf. In an exemplary embodiment, controller 150 is configured not to mischaracterize contact output 15 as output signal 61 (i.e., the flash of light).

The aforementioned process can be repeated at different locations (e.g., localities L) in the glass pane to form a plurality (e.g., an array) of glass bumps 60 in glass pane 20. In an example embodiment, apparatus 100 includes an X-Y-Z stage 170 electrically connected to controller 150 and configured to move glass pane 20 relative to focused laser beam 112F in the X, Y and Z directions, as indicated by large arrows 172. This allows for a plurality of glass bumps 60 to be formed by selectively translating stage 170 via a stage control signal ST from controller 150 and irradiating different locations in glass pane 20. In another example embodiment, focusing optical system 120 is adapted for scanning so that focused laser beam 112F can be selectively directed to locations in glass pane 20 where glass bumps 60 are to be formed.

As mentioned above, conventional methods of operating apparatus 100 include irradiating the glass article with a laser irradiation for a set period of time (e.g., Ti+Tc+Tf=1.8 seconds). That is, the glass article is exposed to laser beam 112F at a plurality of localities L with a fixed dose of laser irradiation.

By controlling the laser irradiation dose at each locality L only during exposure time Tf according to the present methods, each glass bump 60 has a more controlled height H60 as compared to glass bumps formed by conventional methods. Specifically, the present methods of operating apparatus 100 result in a plurality of glass bumps 60 with a standard deviation of less than 1.1 microns, or less than 1 micron, or even less than 0.5 micron. In alternative embodiments, the standard deviation may be 0 microns, or greater than 0.1 micron. Accordingly, controlling the laser irradiation dose at each locality L during exposure time Tf (after the flash of light is detected) allows more precise control of height H of glass bumps 60 during laser irradiation formation.

Glass articles having a plurality of glass bumps with heights within a standard deviation of 1 micron can be used in windows. For example, glass bumps of the present disclosure may be used as spacers between parallel, opposing panes of glass in a vacuum-insulated glass (VIG) window. The distance between the parallel, opposing panes of glass in VIG window is substantially equivalent to the heights of the glass bumps. An advantage of minimal height variance (less than 1 micron, or 0.5 micron, and greater than 0.1 micron) is the minimization of mechanical stresses at the contact point between glass bump 60 terminal point 13 and the opposing glass pane. In another example, the bumps may acts as spacers between the glass article and other materials. In yet another example, the glass bumps with minimal height variation may have aesthetic advantages.

EXAMPLES

The methods of the present disclosure for controlling height amongst a plurality of glass bumps grown on a glass article with laser irradiation will be further clarified with reference to the following examples.

Example 1

In this example a soda-lime glass pane (4 mm thickness) was disposed relative to a laser apparatus similar to apparatus 100 described above. The apparatus and laser were operated consistent with conventional methods (i.e., without the use of a photodiode to detect a flash of light from a laser irradiated locality). That is, the height control methods of the present disclosure where not used. 18 glass bumps were formed by laser irradiation at a distance apart from each other on the glass pane.

During laser exposure at each locality L, the laser was set at 15 watts with a UV wavelength of 355 nanometers. The total time for exposure of the glass pane's 18 localities to laser irradiation was set as fixed at 1.8 seconds (i.e., Ti+Tc+Tf=1.8 seconds). That is, each of the 18 localities individually received the same dose of laser radiation (ignoring potential laser output variations) to form each of the 18 glass bumps.

Figure 4:
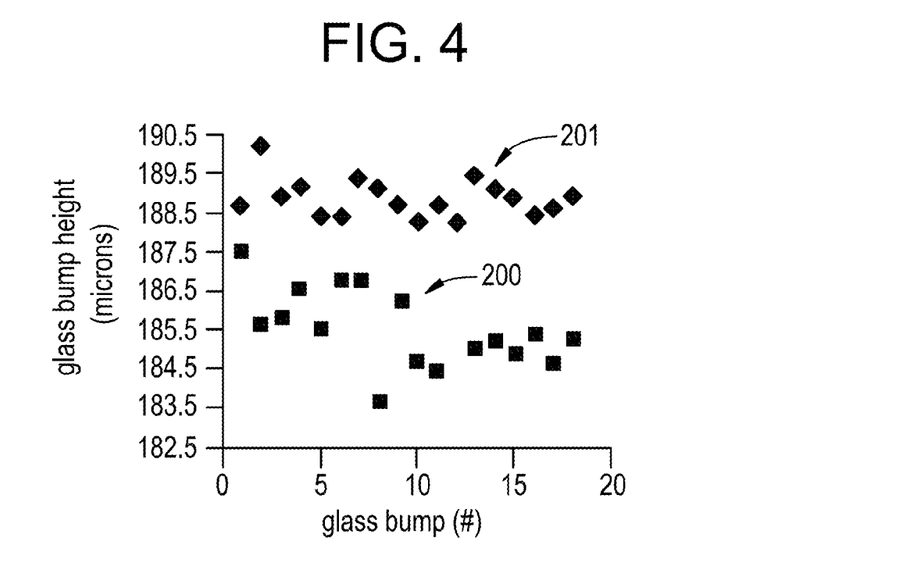
FIG. 4 is a plot diagram comparing height between a plurality of laser-based glass bumps formed according to an exemplary embodiment of the present disclosure with height control versus height between a plurality of laser-based glass bumps formed according to the conventional methods without height control.

Following the laser irradiation operation, the glass bumps heights H were measured, using an optical scanning profilometer, from the glass pane surface to the highest terminal point. FIG. 4 illustrates the height measurements of each of the 18 resultant glass bumps for this example with square data points 200. Table 1 below provides a numerical summary of the FIG. 4 results. The average height for the 18 glass bumps of this example was 185.4 µm. The maximum deviation and minimum deviation from the average height was 2.1 and −2.4, respectively. Accordingly, the standard deviation for the glass bumps heights of this example was 1.1 microns.

Example 2

In this example, the soda lime glass pane from Example 1 was disposed relative to the same laser apparatus as described in Example 1. In this example however, a photodiode was disposed adjacent to the glass pane near the surface first exposed to the laser. That is, as illustrated in FIG. 2, the photodiode 180 was arranged above the front surface 22 of the glass pane 20 in close proximity to locality L. The apparatus and laser were operated consistent with the presently disclosed methods for controlling the height of glass bumps to form 18 glass bumps at a distance apart from each other on the glass pane.

During operation of the laser at each locality L, the laser was set at 15 watts with a UV wavelength of 355 nanometers. In this example, time increments Ti and Tc were not set, fixed increments for each of the 18 localities. Instead, after the flash of light was detected (i.e., output signal 61 ramping up) by controller 150, only exposure time Tf was fixed at 1.6 seconds. The inventors chose 1.6 seconds for exposure time Tf because time increments Ti and Tc were estimated at 0.2 seconds during Example 1. Accordingly, laser irradiation was initiated at each locality individually. After the photodiode detected the flash of light from a locality, the controller terminated laser irradiation at that locality 1.6 seconds thereafter. Time increments Ti and Tc were not controlled or measured in any way. Again, the photodiode electronic signal 181 from one of these localities is illustrated in FIG. 3.

Following the laser irradiation operation, the glass bumps 60 heights H were measured from the glass pane surface to the highest terminal point. Also, the radius of curvature R3 of the convexly rounded top surface (along the top 1-3% of height H60) of plurality of glass bumps was measured as between about 600 microns to about 750 microns. FIG. 4 illustrates the narrow height distribution measurements for each of the 18 resultant glass bumps for this example with diamond data points 201. Table 1 below provides a numerical summary of the FIG. 4 results. The average height for the 18 glass bumps of this example was 188.9 microns. Unexpectedly, the maximum deviation and minimum deviation from the average height was 1.3 and −0.7, respectively. Further unexpected, the standard deviation for the glass bumps heights of this example was 0.5 microns.

TABLE 1

Comparison of Example 1 and Example 2 Bump Height Measurements shown in FIG. 4.

| Example 1 Bump Heights shown as square data points 200 (without height control) | | Example 2 Bump Heights shown as diamond data points 201 (with height control) | |
| --- | --- | --- | --- |
| Number of bumps | 18 | Number of bumps | 18 |
| Average bump height | 185.4 microns | Average bump height | 188.9 microns |
| Max deviation | 2.1 microns | Max deviation | 1.3 microns |
| Min deviation | −2.4 microns | Min deviation | −0.7 microns |
| Standard deviation | 1.1 microns | Standard deviation | 0.5 microns |

It was unexpected that the glass bumps in Example 2 had a more than 50% standard deviation of height reduction as compared to Example 1 glass bumps. By reducing control of the laser radiation dose at each locality until the flash of light is detected by the photodiode, the height distribution is reduced for glass bumps formed according to the present methods. One of ordinary skill would have expected to see an increased standard deviation of glass bump height by reducing control of laser irradiation dose at a particular locality. That is, by only controlling exposure time Tf (and not controlling time increments Ti and Tc), one of ordinary skill in the art would have expected to increase the standard deviation of height for the glass bumps above 1.1 microns. Instead, the standard deviation of height for the 18 glass bumps in Example 2 was reduced to below 1 micron, in fact, 0.5 micron.

The difference in average bump height between Example 1 and Example 2 can be attributed to an increased laser irradiation dose for Example 2 glass bumps as compared to Example 1 glass bumps. Specifically, Example 2 bumps were likely irradiated for a longer period of time based on the 0.2 second time estimation for time increments Ti and Tc from Example 1. The average bump height of Example 2 glass bumps could be adjusted by simply reducing exposure time Tf from 1.6 seconds to 1.5 seconds or less for example.

As used herein, the singular forms "a," "an," and "the" include plural referents unless the context clearly dictates otherwise. Thus, for example, reference to a "metal" includes examples having two or more such "metals" unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It is also noted that recitations herein refer to a component of the present invention being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

It will be apparent to those skilled in the art that various modifications and variations can be made to the present invention without departing from the spirit and scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A glass article including a plurality of glass bumps formed on a surface of the glass article, each glass bump having a height spaced apart from the glass article surface, at least one of the plurality of glass bumps comprising:
    a lower region comprising a diameter D1 defined by concavely rounded sides, wherein the lower region projects from the surface of the glass pane, wherein diameter D1 is the glass bump maximum diameter, wherein the concavely rounded sides have a radius of curvature R1 and join with the glass article surface;
    an inflection region connecting the lower region of the glass bump and an upper region of the glass bump;
    the upper region of the glass bump comprising a transition portion and a top portion;
    the transition portion comprising a diameter D2 defined by convexly rounded sides, wherein the convexly rounded sides have a radius of curvature R2, wherein diameter D2 is less than diameter D1; and
    the top portion comprising a diameter D3 defined by a convexly rounded top surface, the convexly rounded top surface joining with the convexly rounded sides converging from the transition portion, wherein the convexly rounded top surface has a radius of curvature R3 from about 600 microns to about 750 microns which is greater than the radius of curvature R2, wherein diameter D3 is less than diameter D2, wherein the convexly rounded top surface is spaced apart from the glass article surface defining a height H of the glass bump.

2. The glass article of claim 1 wherein a standard deviation of height between the plurality of glass bumps is less than 1 micron.

3. The glass article of claim 1 wherein a standard deviation of height between the plurality of glass bumps is less than 0.5 micron.

4. The glass article of claim 1 wherein the radius of curvature R1 of concavely rounded sides of the lower region is from about 25 microns to about 100 microns.

5. The glass article of claim 1 wherein diameter D1 of the lower region is from about 400 microns to about 800 microns.

6. The glass article of claim 1 wherein the radius of curvature R2 of the convexly rounded sides of the transition portion is from about 200 microns to about 400 microns over at least 5% of the glass bump height H.

7. The glass article of claim 1 wherein diameter D2 of the transition portion decreases from the inflection region to the top portion by about 15% to about 65%.

8. The glass article of claim 1 wherein diameter D2 of the transition portion is from about 100 microns to about 600 microns.

9. The glass article of claim 1 wherein diameter D3 of the top portion is from about 100 to about 264 microns.

10. The glass article of claim 1 wherein glass bump height H is from about 50 microns to about 200 microns.

11. The glass article of claim 1 wherein at least one of the plurality glass bumps include a hemispherical lateral cross-section, wherein the lateral cross-section substantially corresponds to a general circle curve equation with a coefficient of determination from 0.9 to 0.99.

12. The glass article of claim 1 wherein the lower region is from about 5% to about 25% of glass bump height H.

13. The glass article of claim 1 wherein the upper region is from about 75% to about 95% of glass bump height H.

14. The glass article of claim 1 wherein the top portion is from about 1% to about 3% of glass bump height H.

15. The glass article of claim 1 wherein the glass article is a glass pane.

16. The glass article of claim 15 wherein the glass pane is included within a vacuum insulated glass window.

17. A glass article including a plurality of glass bumps formed on a surface of the glass article, each glass bump having a height spaced apart from the glass article surface, at least one of the plurality of glass bumps comprising:
    a lower region comprising a volume V1 with a diameter D1 defined by concavely rounded sides, wherein the lower region projects from the glass pane surface, wherein diameter D1 is the glass bump maximum diameter, wherein the concavely rounded sides have a radius of curvature R1 and join with the glass pane surface;

an inflection region connecting the lower region of the glass bump and an upper region of the glass bump;

the upper region comprising a volume V2 having a transition portion and a top portion;

the transition portion comprising a diameter D2 defined by convexly rounded sides, wherein the convexly rounded sides have a radius of curvature R2, wherein diameter D2 is less than diameter D1; and the top portion comprising a diameter D3 defined by a convexly rounded top surface, the convexly rounded top surface joining with the convexly rounded sides converging from the transition portion, wherein the convexly rounded top surface has a radius of curvature R3 from about 600 microns to about 750 microns which is greater than the radius of curvature R2, wherein diameter D3 is less than diameter D2, wherein the convexly rounded top surface is spaced apart from the glass pane surface defining a maximum height H of the glass bump.

18. The glass article of claim 17 wherein a standard deviation of height between the plurality of glass bumps is less than 1 micron.

19. The glass article of claim 17 wherein a standard deviation of height between the plurality of glass bumps is less than 0.5 micron.

20. The glass article of claim 17 wherein the radius the radius of curvature R3 of the convexly rounded top surface is greater than the radius of curvature R2 for the convexly rounded sides.

21. The glass article of claim 17 wherein R3 is greater than R2 by about 70% to about 140%.

22. The glass article of claim 17 wherein the radius of curvature R3 of the convexly rounded top surface is greater than the radius of curvature R1 for the concavely rounded sides of the lower region.

* * * * *

UNITED STATES PATENT AND TRADEMARK OFFICE
CERTIFICATE OF CORRECTION

| | | |
|---|---|---|
| PATENT NO. | : 9,714,194 B2 | Page 1 of 1 |
| APPLICATION NO. | : 15/141647 | |
| DATED | : July 25, 2017 | |
| INVENTOR(S) | : Masters et al. | |

It is certified that error appears in the above-identified patent and that said Letters Patent is hereby corrected as shown below:

In the Claims

Column 16; Claim 20 reads: after "The glass article of claim 17 wherein the radius" remove the duplication of the words -- the radius --

Signed and Sealed this
Fourteenth Day of January, 2025

Derrick Brent
*Acting Director of the United States Patent and Trademark Office*